US010356161B2

United States Patent
Bajaj et al.

(10) Patent No.: US 10,356,161 B2
(45) Date of Patent: Jul. 16, 2019

(54) SYSTEM AND METHOD FOR CLASSLOADING IN A MULTITENANT APPLICATION SERVER ENVIRONMENT

(71) Applicant: ORACLE INTERNATIONAL CORPORATION, Redwood Shores, CA (US)

(72) Inventors: Aseem Bajaj, Pleasanton, CA (US); Lawrence Feigen, Watchung, NJ (US); Bryan Atsatt, Half Moon Bay, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 614 days.

(21) Appl. No.: 14/866,042

(22) Filed: Sep. 25, 2015

(65) Prior Publication Data

US 2016/0094626 A1    Mar. 31, 2016

Related U.S. Application Data

(60) Provisional application No. 62/055,574, filed on Sep. 25, 2014.

(51) Int. Cl.
*H04L 29/08* (2006.01)
*G06F 9/445* (2018.01)

(52) U.S. Cl.
CPC .......... *H04L 67/10* (2013.01); *G06F 9/44521* (2013.01); *H04L 67/34* (2013.01)

(58) Field of Classification Search
CPC ....................................... H04L 67/10

(Continued)

(56) References Cited

U.S. PATENT DOCUMENTS 8,966,464 B1 *  2/2015  Christopher ........ G06F 11/0712
                                                     717/166
2007/0006203 A1 *  1/2007  Marwinski .......... G06F 9/44536
                                                     717/166

(Continued)

FOREIGN PATENT DOCUMENTS

| CN | 101639835 | 2/2010 |
|---|---|---|
| CN | 102170457 | 8/2011 |

(Continued)

OTHER PUBLICATIONS

European Patent Office, International Searching Authority, International Search Report and Written Opinion dated Apr. 24, 2015 for International Application No. PCT/US2015/012268, 10 Pages.

(Continued)

*Primary Examiner* — Khanh Q Dinh
*Assistant Examiner* — Emad Siddiqi
(74) *Attorney, Agent, or Firm* — Tucker Ellis LLP

(57) ABSTRACT

In accordance with an embodiment, described herein is a system and method for classloading in a multitenant application server environment. The system includes a domain with a plurality of partitions, and a resource group template including one or more applications, each configured with code shareable across the plurality of partitions. A class loader hierarchy can be created for each application instance in a partition, wherein the class loader hierarchy includes a class loader structure for that application instance, a partition class loader for the partition, and a shared application class loader for all instances of that application. At runtime, the class loader structure for an application instance can use the partition class loader as a parent class loader to load classes visible to the partition, and use the shared application class loader as an alternative parent class loader.

20 Claims, 9 Drawing Sheets

(58) Field of Classification Search
USPC .......................................................... 709/203
See application file for complete search history.

(56) References Cited

U.S. PATENT DOCUMENTS

| | | | |
|---|---|---|---|
| 2011/0213870 A1 | 9/2011 | Cal | |
| 2012/0072597 A1 | 3/2012 | Leather | |
| 2012/0110566 A1 | 5/2012 | Park | |
| 2013/0263123 A1* | 10/2013 | Zhou | ................... G06F 9/45504 |
| | | | 718/1 |
| 2015/0128147 A1* | 5/2015 | Holt | ................... G06F 12/0253 |
| | | | 718/104 |

FOREIGN PATENT DOCUMENTS

| | | |
|---|---|---|
| CN | 102333115 | 1/2012 |
| CN | 102571821 | 7/2012 |
| CN | 102609271 | 7/2012 |
| CN | 102932404 | 2/2013 |
| CN | 102932405 | 2/2013 |
| CN | 103455512 | 12/2013 |
| CN | 102571916 | 11/2015 |

OTHER PUBLICATIONS

Chinese Patent Office, Office Action dated Jul. 20, 2018 for Application No. 201580003512.6, 8 pages.

* cited by examiner

SYSTEM AND METHOD FOR CLASSLOADING IN A MULTITENANT APPLICATION SERVER ENVIRONMENT

CLAIM OF PRIORITY AND CROSS-REFERENCE TO RELATED APPLICATIONS

This application claims the benefit of priority to U.S. Provisional Application titled "SYSTEM AND METHOD FOR CLASSLOADING IN A MULTITENANT APPLICATION SERVER ENVIRONMENT", Application No. 62/055,574, filed Sep. 25, 2014; and is related to U.S. Provisional Application titled "SYSTEM AND METHOD FOR SUPPORTING MULTITENANCY IN AN APPLICATION SERVER, CLOUD, OR OTHER ENVIRONMENT", Application No. 61/929,888, filed Jan. 21, 2014; and U.S. patent application titled "SYSTEM AND METHOD FOR SUPPORTING MULTI-TENANCY IN A APPLICATION SERVER, CLOUD, OR OTHER ENVIRONMENT", application Ser. No. 14/601,883, filed Jan. 21, 2015; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud environments, and are particularly related to a system and method for classloading in a multitenant application server environment.

BACKGROUND

Software application servers, examples of which include Oracle WebLogic Server (WLS) and Glassfish, generally provide a managed environment for running enterprise software applications. Recently, technologies have also been developed for use in cloud environments, which allow users or tenants to develop and run their applications within the cloud environment, and to take advantage of distributed resources provided by the environment. As such, class loaders, as a fundamental module of any software application server, need to be modified to fulfill the requirements of such a cloud environment.

SUMMARY

In accordance with an embodiment, described herein is a system and method for classloading in a multitenant application server environment. The system includes a domain with a plurality of partitions, and a resource group template including one or more applications, each configured with code shareable across the plurality of partitions. A class loader hierarchy can be created for each application instance in a partition, wherein the class loader hierarchy includes a class loader structure for that application instance, a partition class loader for the partition, and a shared application class loader for all instances of that application. At runtime, the class loader structure for an application instance can use the partition class loader as a parent class loader to load classes visible to the partition, and use the shared application class loader as an alternative parent class loader.

DETAILED DESCRIPTION

In accordance with an embodiment, described herein is a system and method for classloading in a multitenant application server environment. The system includes a domain with a plurality of partitions, and a resource group template including one or more applications, each configured with code shareable across the plurality of partitions. A class loader hierarchy can be created for each application instance in a partition, wherein the class loader hierarchy include a class loader structure for that application instance, a partition class loader for the partition, and a shared application class loader for all instances of that application. At runtime, the class loader structure for an application instance can use the partition class loader as a parent class loader to load classes visible to the partition, and use the shared application class loader as an alternative parent class loader.

Application Server (e.g., Multi-Tenant, MT) Environment

Figure 1:
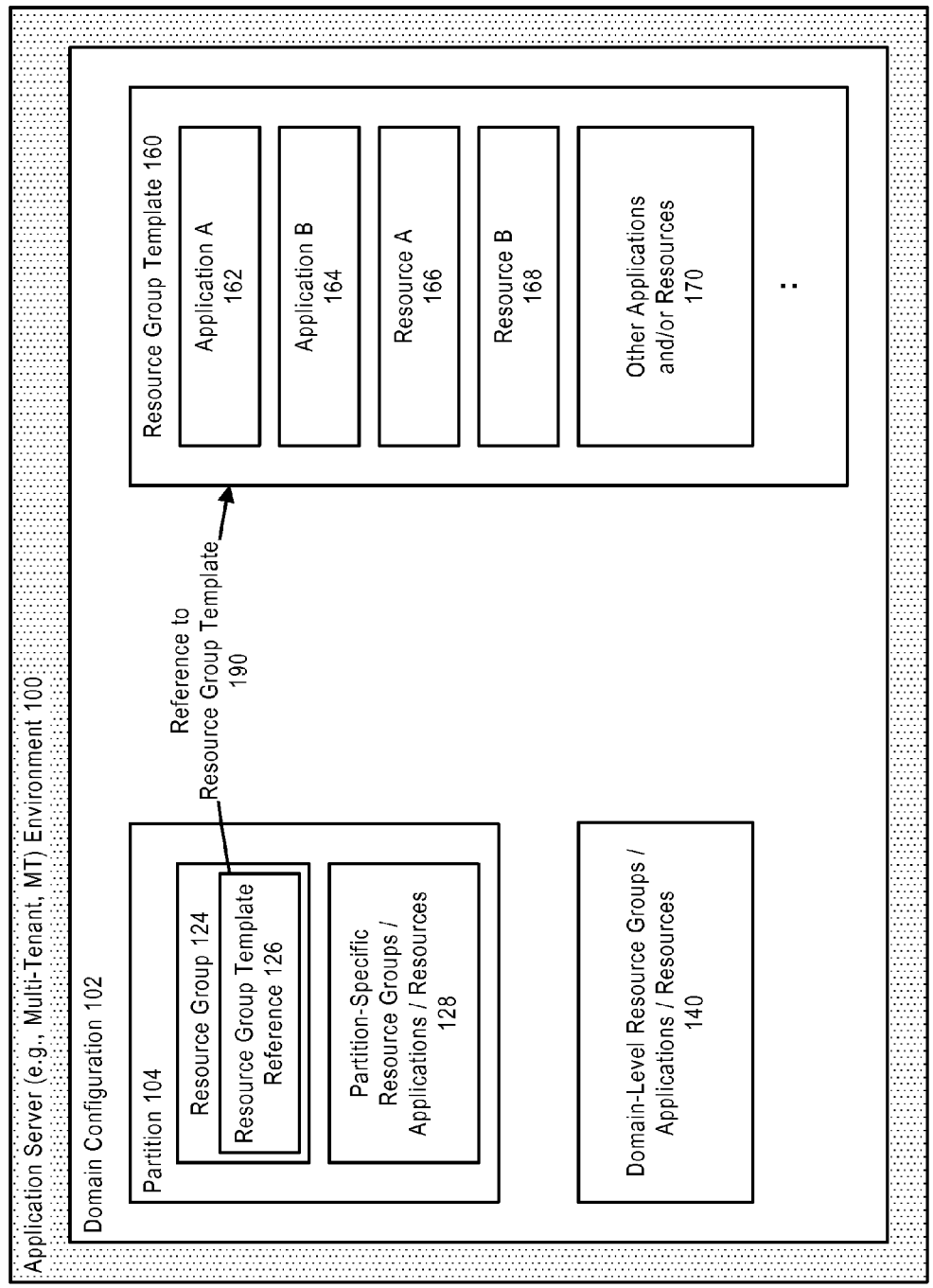
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
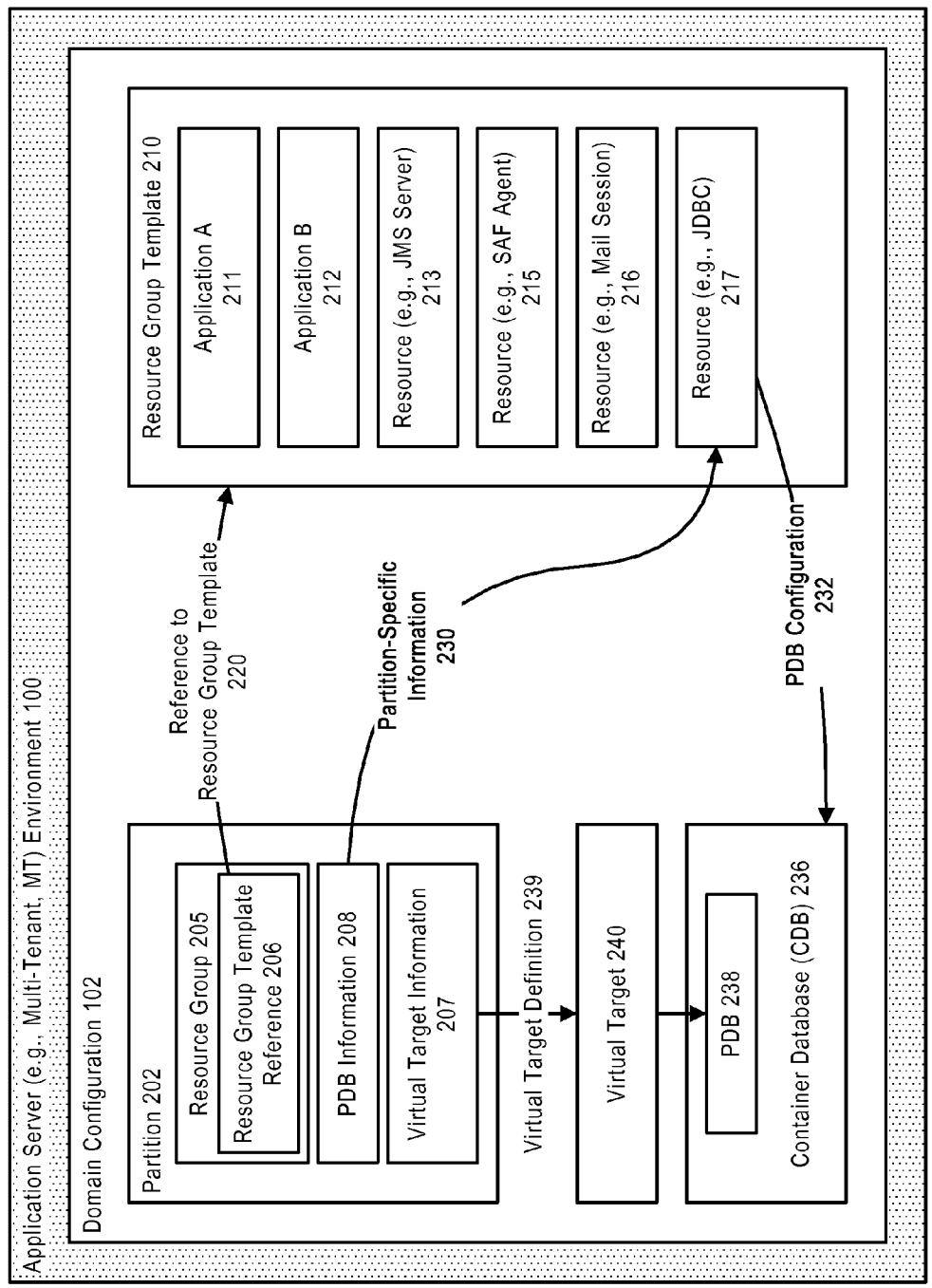
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
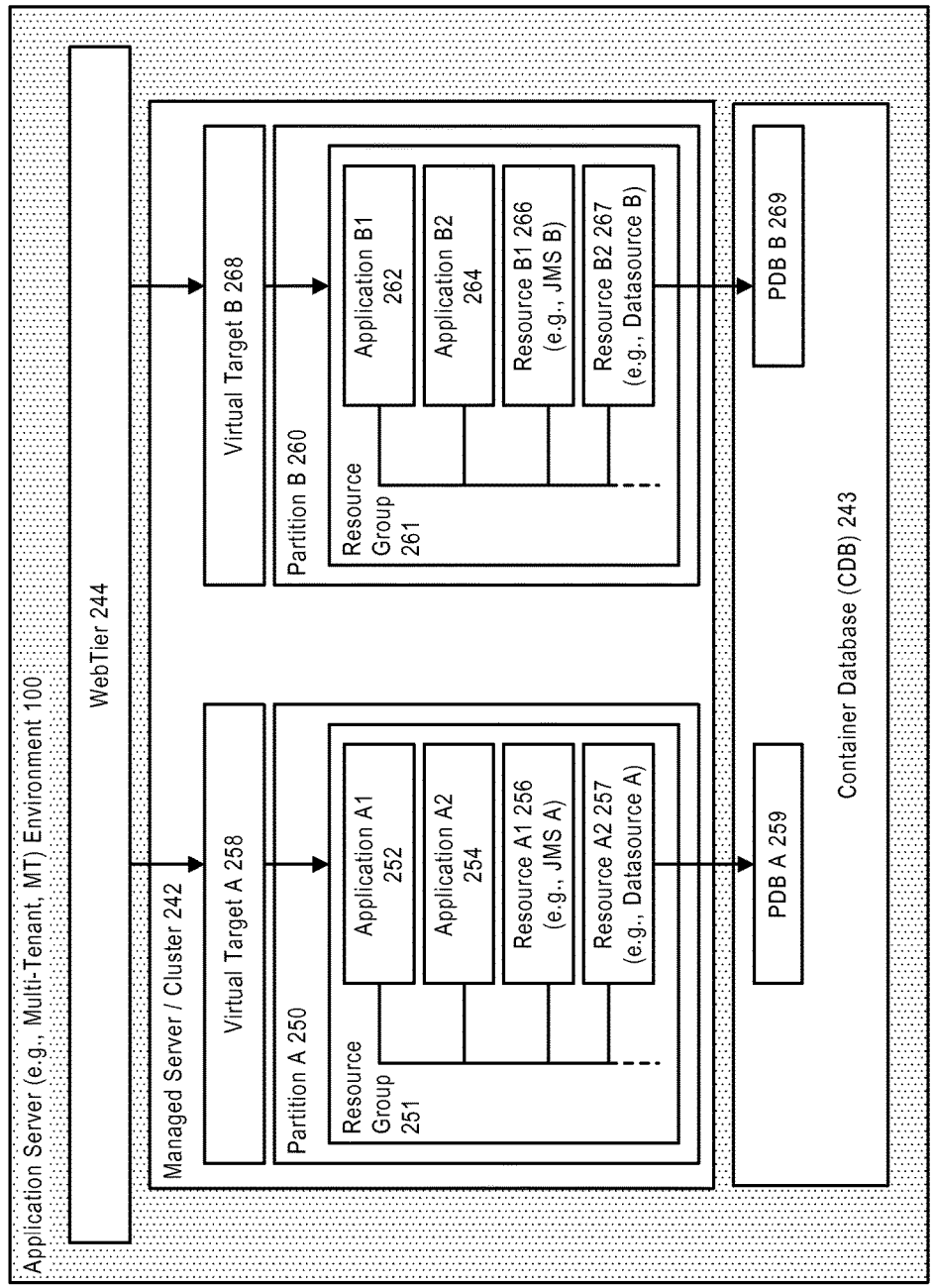
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition.

Figure 4:
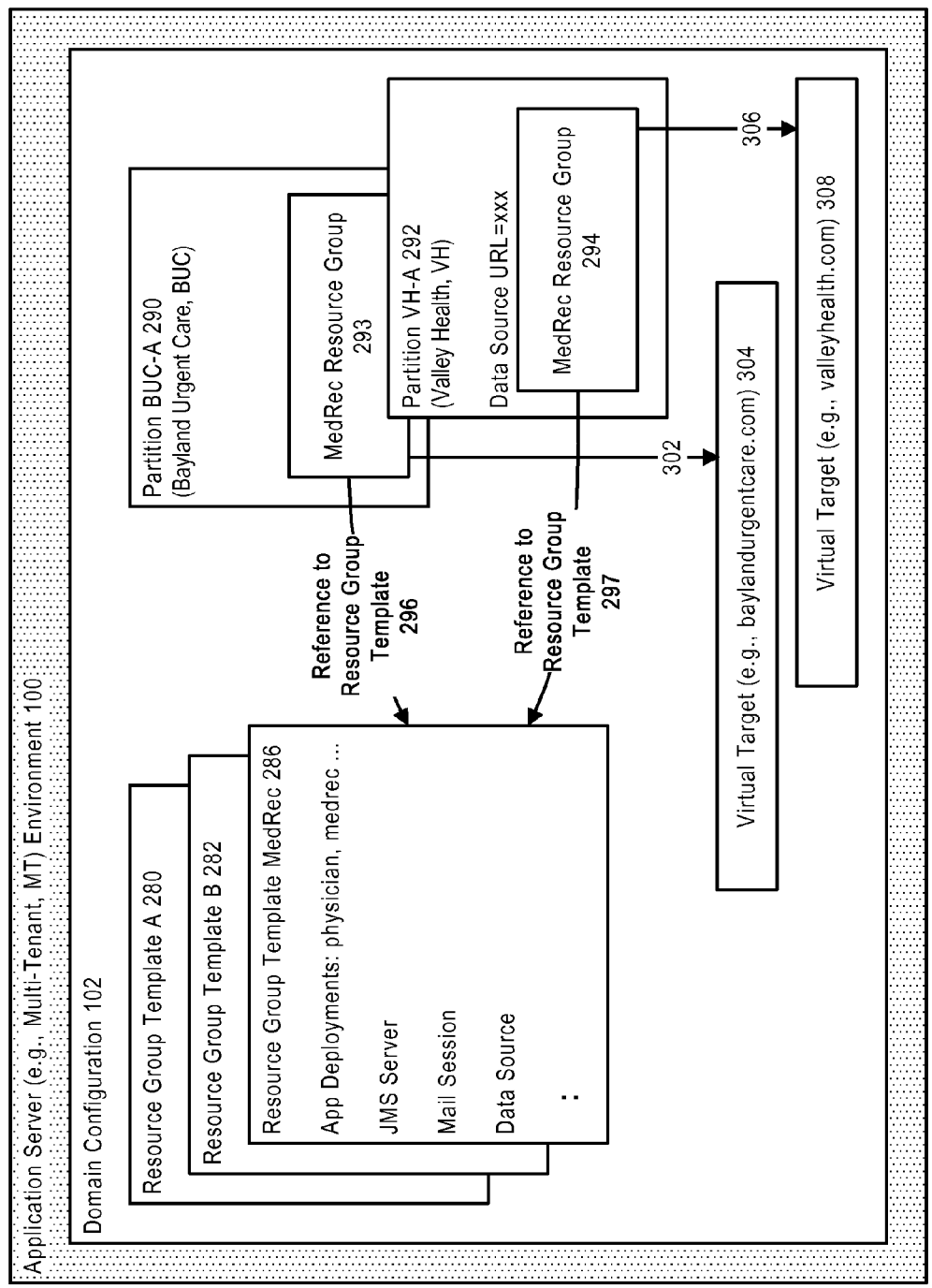
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
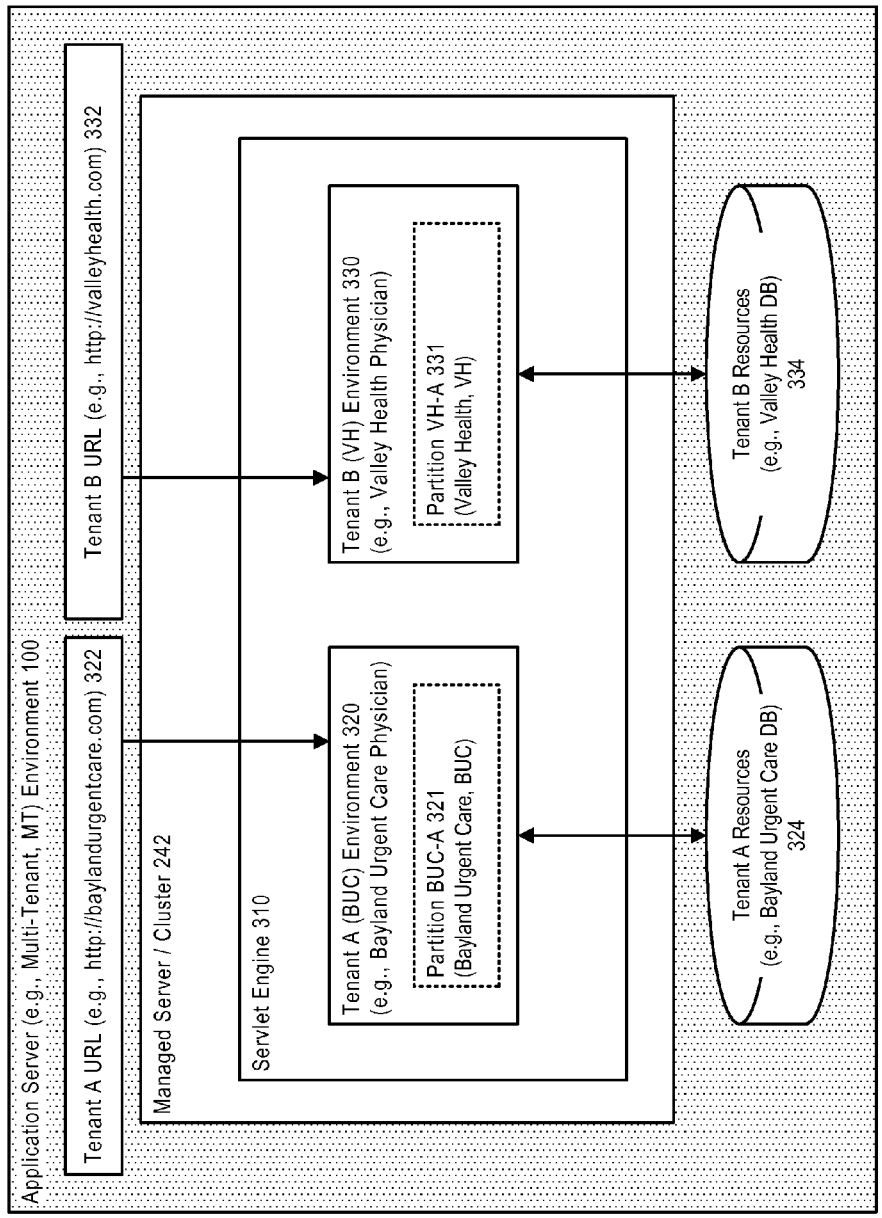
FIG. 5 further illustrates an exemplary multi-tenant environment, in accordance an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.

Classloading

In a traditional application server (for example, WebLogic server) environment, classloading is application-specific. Each application can have its own class loader hierarchy, the parent of which hierarchy can be a system class loader. An application has visibility to classes loaded by a class loader of the application, and to classes loaded by class loaders that are parents of the class loader. The isolation of class loader hierarchies between applications allows a single application server instance to host multiple applications within a single application server instance.

In a multi-tenant environment, when an application is deployed to a resource group template and referenced to from multiple partitions, each referencing partition can include its own instance of the same application. In such an environment, loading classes without sharing them across partitions or across application instances within a partition would require a same class to be loaded multiple times, resulting in inefficient use of memory.

In accordance with an embodiment, described herein is a system and method for classloading in a multitenant application server environment. The system includes a domain with a plurality of partitions, and a resource group template including one or more applications, each configured with code shareable across the plurality of partitions. A class loader hierarchy can be created for each application instance in a partition, wherein the class loader hierarchy includes a class loader structure for that application instance, a partition class loader for the partition, and a shared application class loader for all instances of that application. At runtime, the class loader structure for an application instance can use the partition class loader as a parent class loader to load classes visible to the partition, and use the shared application class loader as an alternative parent class loader.

In accordance with an embodiment, the class loading system described above can reside on a single application server instance. Such a class loading system can conserve server memory by limiting the number of times that particular classes are loaded, while still providing needed isolation between partitions.

Figure 6:
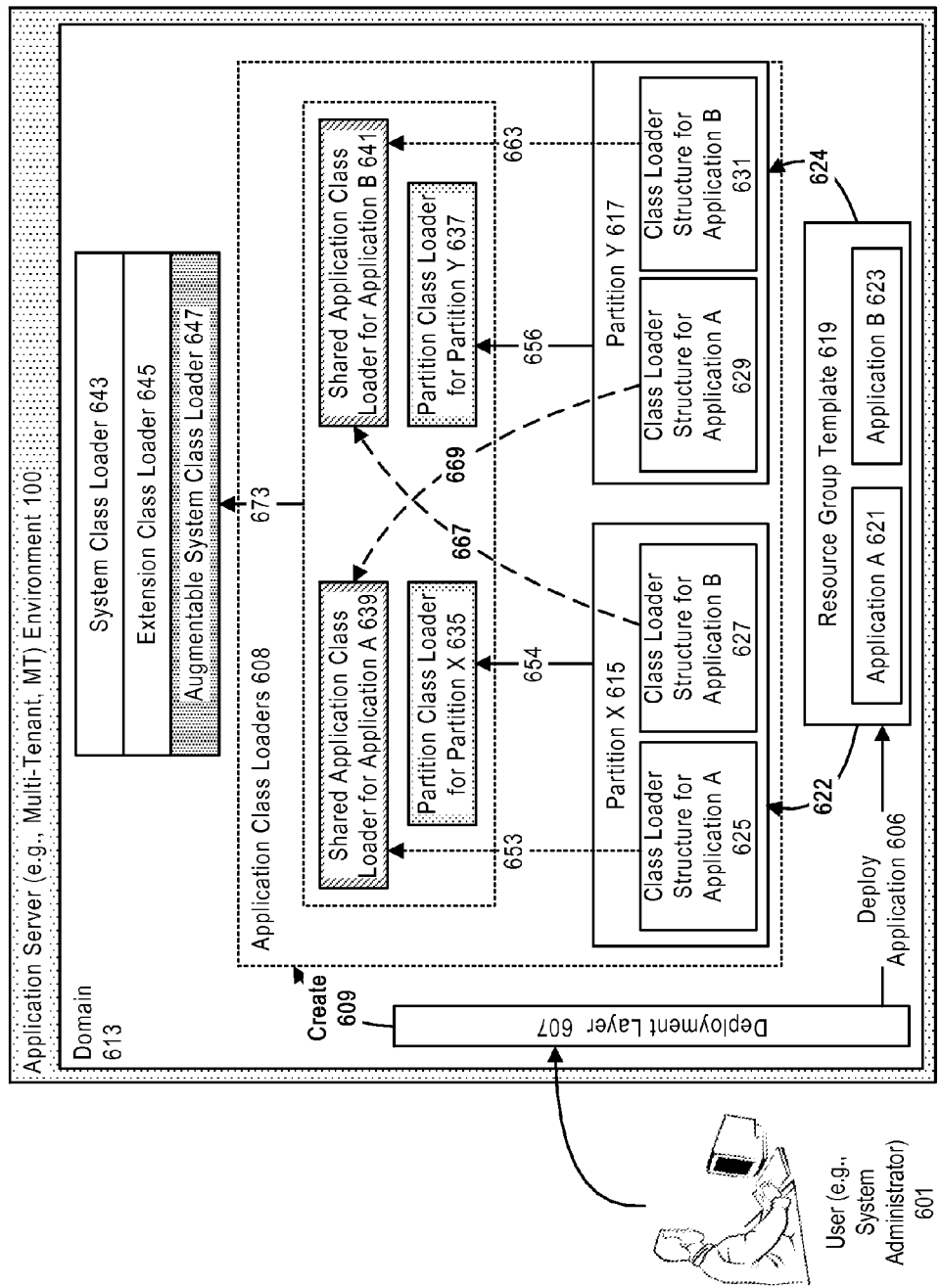
FIG. 6 illustrates classloading in a multitenant application server environment, in accordance with an embodiment.

FIG. 6 illustrates a system for classloading in a multi-tenant application server environment, in accordance with an embodiment.

As shown in FIG. 6, a domain 613 in the application server environment can include a plurality of partitions (for example, partition X 615 and partition Y 617); and a resource group template 619 with a plurality of applications (for example, application A 621 and application B 623). Each application is deployed 622, 624 to the plurality of partitions that reference the resource group template.

In accordance with an embodiment, execution of the applications depends on a class loader hierarchy that includes a system class loader 643, an extension class loader 645 and an augmentable system class loader 647 on the top of the hierarchy. The system class loader can be created on attributes in a domain configuration file, and can load core application server classes. The extension class loader can be created as a child of the system class loader when the system includes extension jars for the domain. The augmentable system class loader can be created as a child of the system class loader or as a child of the extension class loader (if created); and can be the root of all application class loaders 608 in the application server instance.

As shown in FIG. 6, the application class loaders can include a class loader structure for each application instance (for example, class loader structure for application A 625 in partition X, class loader structure for application B 627 in partition X, class loader structure for application B 629 partition Y, or class loader structure for application A 631 in partition Y).

In accordance with an embodiment, the application class loaders can further include a partition class loader for each partition (for example, partition class loader for partition X 635, and partition class loader for partition Y 637); and a shared application class loader for each application with code configured to be shared across the plurality of partitions (for example, shared application class loader for application A 639, and shared application class loader for application B 641).

In an accordance with an embodiment, a partition class loader can load classes visible to a partition, which classes can include one or more global connectors targeted to multiple partitions. A global connector, which is typically configured to be visible and available for all the applications in the application server instances, can be loaded by each partition to isolate the loading of the global connector when the global connector is targeted to multiple partitions. A shared application class loader can load classes visible to all instances of an application that declares one or more shared jars.

As shown in FIG. 6, the partition class loaders and shared application class loaders can be child class loaders 673 of the augmentable system class loader. Classes defined in a partition class loader and closure of all references from those classes may not be defined in a shared application class loader. Similarly, classes defined in a shared application class loader and closure of all references from those classes may not be defined in a partition class loader.

In accordance with an embodiment, the root class loader of each class loader structure for an application instance can include a logic to enable an associated partition class loader as a parent class loader 654, 656, and a shared app class loader as an alternative parent class loader 653, 667, 669, 663.

In accordance with an embodiment, at runtime, when a class is needed for an application instance to be executed, the class loader structure for the application instance can first checks its own cache to determine see if the class has been loaded. If the class is not found in the cache, the class loader structure can request the class from a partition class loader. If the requested class is not found in the partition class loader, the shared application class loader for the application can alternatively be searched. If the requested class is not found in either the partition class loader or the shared application class loader, the class loader structure for the application instance can load the requested class.

In accordance with an embodiment, the shared application class loader can be configured to skip searching its own parent for a requested class, so as not to slow down class loading, as that parent class loader (i.e. the augmentable system class loader) would have already been consulted by a partition class loader.

As shown in FIG. 6, each partition class loader and shared application class loader can search parent class loaders up the class loader hierarchy, before indicating to a class loader structure that the requested class is not found.

In accordance with an embodiment, the application class loaders can be created 609 by a deployment layer 607 of the domain when the applications are deployed 606 by a user (for example, a system administrator) 601.

Figure 7:
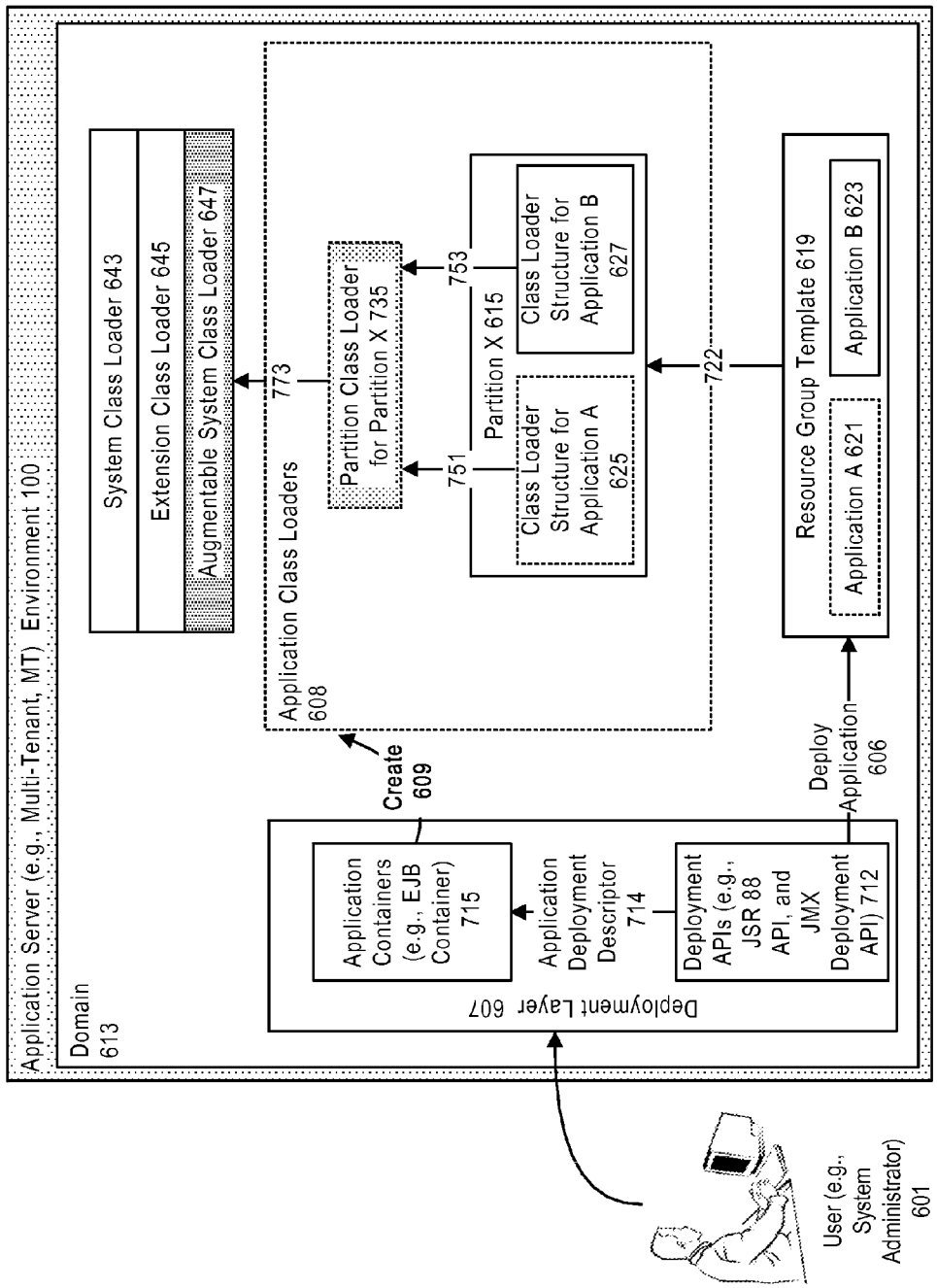
FIG. 7 illustrates classloading in a multitenant application server environment, in accordance with an embodiment.

FIG. 7 further illustrates a system for classloading in a multi-tenant application server environment, in accordance with an embodiment.

As shown in FIG. 7, the deployment layer of the domain can include deployment APIs 712 and application containers 715. The deployment APIs can analyze an application deployment descriptor 714 and communicate with an administration server in the domain, which further communicates with one or more managed servers therein. The application containers on the managed servers can create the application class loaders for use in loading and finding all the class needed for the execution of an application instance.

In accordance with an embodiment, a partition class loader can be created when a new partition is created, and a first application is being deployed 722 to the partition through a resource group template.

For example, the partition class loader for partition X can be created when a first application (for example, application A) is being deployed to the partition. The partition class loader can be configured as a parent class loader 751, 753 of each class loader structure for an application instance in the partition; and can load classes visible to all application instances within the partition.

Figure 8:
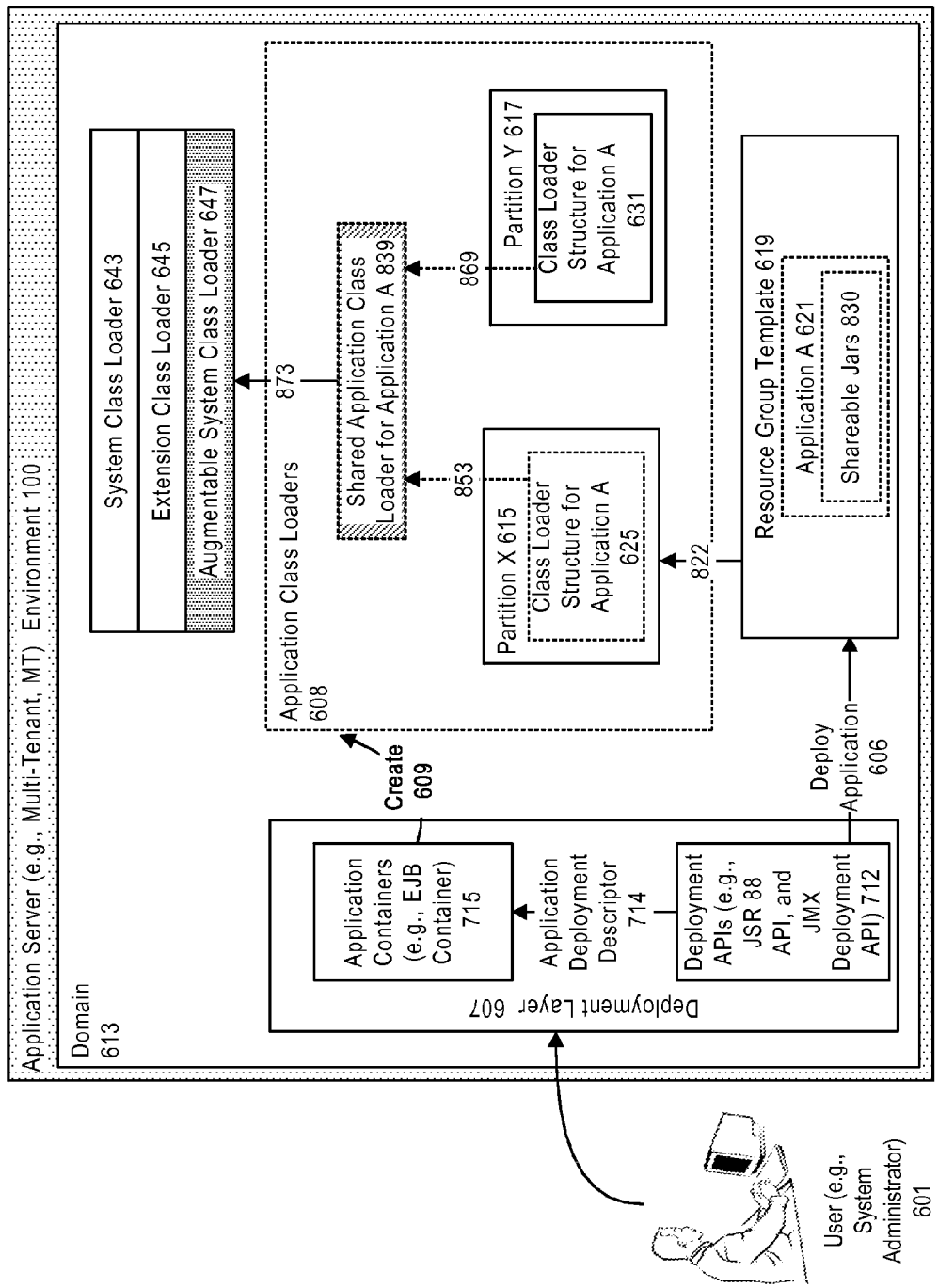
FIG. 8 illustrates classloading in a multitenant application server environment, in accordance with an embodiment.

As further shown in FIG. 8, the parent class loader 873 of the partition class loader for partition X is the augmentable system class loader.

In accordance with an embodiment, the partition class loader can be removed when the partition is being removed and the last application for the partition is being undeployed.

Shared Application Class Loader

FIG. 8 further illustrates a system for classloading in a multi-tenant application server environment, in accordance with an embodiment.

As shown in FIG. 8, the application A in the resource group template can include one or more shareable jars 830.

For example, the one or more shareable jars can include classes associated with metadata services (MDS), SOA, application development framework (ADF), or ApplCore. These classes can be loaded by a shared application class loader and shared from a class loader cache by multiple instances of the application A deployed to multiple partitions (for example, partition X and partition Y).

In accordance with an embodiment, the shareable jars can be packaged in the application and declared to be shareable using a configuration file (for example, an application deployment descriptor).

Listing 1 below illustrates such an application deployment descriptor in accordance with an embodiment.

---
Listing 1
---

```
<class-loading>
    <shareable dir="APP-INF-LIB">
        <include>coupon-generator.jar</include>
        <include>group-discounts.jar</include>
    </shareable>
    <shareable dir="LIB-DIR">
        <exclude>program-guide.jar</exclude>
    </shareable>
</class-loading>
```

As shown in Listing 1, the "dir" attribute can identify a directory where one or more following patterns apply. The supported values of "dir" include "APP-INF-LIB" for identifying WebLogic style APP-INF/lib, "LIB-DIR" for identifying JavaEE style library-directory, and "APP-INF-CLASSES" for identifying WebLogic style APP-INF/classes.

In accordance with an embodiment, for "APP-INF-LIB" and for "LIB-DIR", the include configuration can identify jar files determined to be sharable by a developer. The classes in the shareable jars may not have dependency on partition scoped classes (for example, global connectors), or classes in jars determined not to be shareable. For "APP-INF-LIB" and for "LIB-DIR", the exclude element can identify jars that may not be shared. For "APP-INF-CLASSES", the "include" and "exclude" configurations can be ignored, as identifying "APP-INF-CLASSES" as shareable can indicate that all the classes in an application are declared shareable. If "APP-INF-LIB" or "LIB-DIR" is identified without any "include" or "exclude" configuration, all the jars in that directory are considered shareable.

In accordance with an embodiment, the configurations shown Listing 1 are valid for the packaging unit that contains the application deployment descriptor, wherein the packaging unit can be an enterprise archive (EAR) file, a web application archive (WAR) file, an enterprise JavaBeans (EJB) jar, or another file type. Other approaches of configuring shareable jars or shareable code in an application can be used.

Referring to FIG. 8, when the application with the application X with the shareable jars is deployed 822 to a partition from the resource group template, a class loader structure for the application instance can be created in a particular partition (for example, class loader structure for application A in partition X). If this particular partition is the first partition to which the configured shareable jars is being deployed from the resource group template, a new shared application class loader (for example, the shared application class loader for application A 839) can be created.

As further shown in FIG. 8, this shared application class loader can be an alternative parent class loader 853, 869, and a child class loader 873 of the augmentable system class loader.

In accordance with an embodiment, the shared application class loader can be created by the deployment layer what analyze the deployable artifact of the application to determine if there are any shareable jars configured for the application. The shared application class loader can be removed when the application is being removed from the resource group template and the application is being undeployed for the last partition that references the resource group template.

In accordance with an embodiment, filtering can be supported at the shared application level. Filter configurations can be overridden in a same way for each application instance, to ensure that the filter configurations be the same between a shared application class loader and the root class loaders of all application instances associated with the shared application class loader. If configured differently, the shared application class loader cannot be used for subsequent application instances.

In accordance with an embodiment, classes that a partition class loader loads may not depend on classes loaded by a shared application class loader and vice-versa. As described above, when a root class loader of an application instance cannot find a class in a partition class loader, the root class loader can alternatively search a shared application class loader.

In accordance with an embodiment, an originating context in the shared application class loader can be used to determine whether to skip consulting the parent of the shared application class loader. If the root class loader of the application instance invokes the class loading action, the shared application class loader can skip consulting its parent. Otherwise, if the class loading action is a result of another class in the shared application class loader, the parent of the shared application class loader can be consulted.

In accordance with an embodiment, a class shareable across multiple application instances cannot depend on a class that is not shared between the application instances. As such, when the shareable class is being loaded from a shared application class loader, the shared application class loader may not load non-shared class.

In accordance with an embodiment, when a jar inside a global connector is identified as shareable, this jar can be configured for being loaded both in a partition class loader and in a shared application class loader. This may not result in any errors, as the partition class loader is consulted first before the shared application class loader (an alternative parent class loader).

In accordance with an embodiment, classes in shareable jars can be pre-processed to achieve various functional goals.

Figure 9:
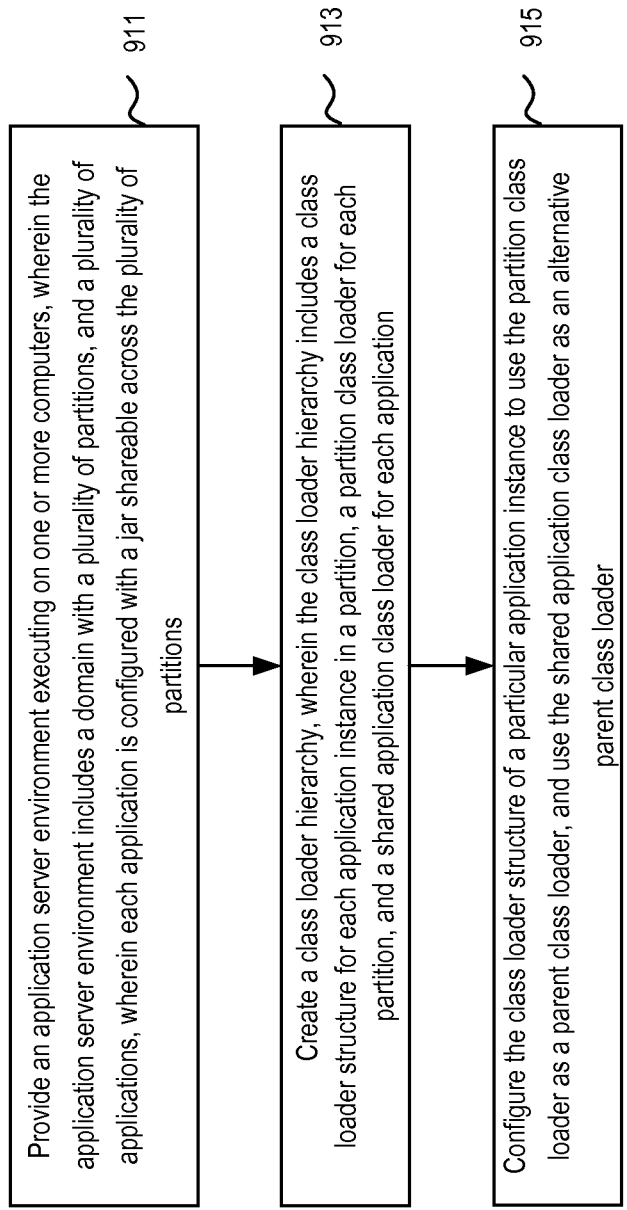
FIG. 9 illustrates a method for classloading in a multi-tenant application server environment, in accordance with an embodiment.

FIG. 9 illustrates a method for classloading in a multi-tenant application server environment, in accordance with an embodiment.

As shown in FIG. 9, at step 911, an application server environment executing on one or more computers can be provided, wherein the application server environment includes a domain with a plurality of partitions, and a plurality of applications, wherein each application is configured with a jar shareable across the plurality of partitions.

At step 913, a class loader hierarchy can be created, wherein the class loader hierarchy includes a class loader structure for each application instance in a partition, a partition class loader for each partition, and a shared application class loader for each application.

At step 915, the class loader structure of a particular application instance is configured to use the partition class loader as a parent class loader, and use the shared application class loader as an alternative parent class loader.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for classloading in a multitenant application server environment, comprising:
   one or more computers, each including a microprocessor;
   an application server environment executing on the one or more computers, wherein the application server environment includes an application server instance, wherein the application server instance includes and operates according to a domain configuration that is used at runtime to define a domain of the application server instance;
   a first partition and a second partition defined within the domain of the application server instance, wherein the first partition represents a first runtime and administrative subdivision of the domain, and wherein the second partition represents a second runtime and administrative subdivision of the domain;
   an application deployed to the domain as a resource of the domain, wherein the application is configured with code that is shareable by the first partition and the second partition;
   a first instance of the application, and a second instance of the application, wherein the first instance of the application is deployed to the first partition and the second instance of the application is deployed to the second partition, and
   a class loader hierarchy that includes:
      a class loader structure that loads server classes of the application,
      a first partition class loader that loads a first instance of a first class such that the first instance of the first class is only visible to the first partition,
      a second partition class loader that loads a second instance of the first class such that the second instance of the first class is only visible to the second partition, and
      a shared application class loader that loads the shareable code of the application, wherein the loaded shareable code is accessible to the first instance of the application deployed to the first partition and the second instance of the application deployed to the second partition.

2. The system of claim 1, wherein the shareable code in the application is configured using an application deployment descriptor.

3. The system of claim 1, wherein the first partition class loader load classes for all application instances within the first partition.

4. The system of claim 1, wherein the first partition class loader is created when the first instance of the application is being deployed to said first partition through a resource group template.

5. The system of claim 1, wherein the first partition class loader is removed when said first partition is removed.

6. The system of claim 1, wherein the shared application class loader loads classes to be shared by said first instance of the application deployed to said first partition and said second instance of the application deployed to said second partition.

7. The system of claim 1, wherein the shared application class loader is created from a resource group template when the first instance of the application is being deployed to the first partition.

8. The system of claim 7, wherein the shared application class loader is removed when the application is being removed from the resource group template and the application is being undeployed from a last partition.

9. The system of claim 1, wherein the class loaders reside on a single application server instance.

10. A method for providing a partition classloader in a multitenant application server environment, comprising:
   providing an application server environment executing on one or more computers, wherein the application server environment includes an application server instance, wherein the application server instance includes and operates according to a domain configuration that is used at runtime to define a domain of the application server instance;
   providing a first partition and a second partition defined within the domain of the application server instance, wherein the first partition represents a runtime and administrative subdivision of the domain, and wherein the second partition represents a second runtime and administrative subdivision of the domain;
   deploying an application to the domain as a resource of the domain, wherein the application is configured with code that is shareable by the first partition and the second partition;
   deploying a first instance of the application to the first partition, and deploying a second instance of the application to the second partition, and
   providing a class loader hierarchy that includes:
      a class loader structure that loads server classes of the application,
      a first partition class loader that loads a first instance of a first class such that the first instance of the first class is only visible to the first partition, a second partition class loader that loads a second instance of the first class such that the second instance of the first class is only visible to the second partition, and a shared application class loader that loads the shareable code of the application, wherein the loaded shareable code is accessible to the first instance of the application deployed to the first partition and the second instance of the application deployed to the second partition.

11. The method of claim 10, wherein the shareable code in the application is configured using an application deployment descriptor.

12. The method of claim 10, wherein the first partition class loader load classes for all application instances within the first partition.

13. The method of claim 10, wherein the first partition class loader is created when the first instance of the application is being deployed to said first partition through a resource group template.

14. The method of claim 10, wherein the first partition class loader is removed when said first partition is removed.

15. The method of claim 10, wherein the shared application class loader loads classes to be shared by said first instance of the application deployed to said first partition and said second instance of the application deployed to said second partition.

16. The method of claim 10, wherein the shared application class loader is created from a resource group template when the first instance of the application is being deployed to the first partition.

17. The method of claim 16, wherein the shared application class loader is removed when the application is being removed from the resource group template and the application is being undeployed from a last partition.

18. The method of claim 10, wherein the class loaders reside on a single application server instance.

19. A non-transitory computer readable storage medium, including instructions stored thereon which when read and executed by one or more computers cause the one or more computers to perform the steps comprising:

providing an application server environment executing on one or more computers, wherein the application server environment includes an application server instance, wherein the application server instance includes and operates according to a domain configuration that is used at runtime to define a domain of the application server instance;

providing a first partition and a second partition defined within the domain of the application server instance, wherein the first partition represents a runtime and administrative subdivision of the domain, and wherein the second partition represents a second runtime and administrative subdivision of the domain;

deploying an application to the domain as a resource of the domain, wherein the application is configured with code that is shareable by the first partition and the second partition;

deploying a first instance of the application to the first partition, and deploying a second instance of the application to the second partition, and providing a class loader hierarchy that includes:
a class loader structure that loads server classes of the application,
a first partition class loader that loads a first instance of a first class such that the first instance of the first class is only visible to the first partition,
a second partition class loader that loads a second instance of the first class such that the second instance of the first class is only visible to the second partition, and
a shared application class loader that loads the shareable code of the application, wherein the loaded shareable code is accessible to the first instance of the application deployed to the first partition and the second instance of the application deployed to the second partition.

20. The non-transitory computer readable storage medium of claim 19, wherein the class loaders reside on a single application server instance.

* * * * *